United States Patent
Chiew et al.

(10) Patent No.: US 7,965,202 B1
(45) Date of Patent: Jun. 21, 2011

(54) SYSTEM, SYSTEM, MODULE, AND METHOD FOR PRESENTING AN ABBREVIATED PATHWAY ON AN AIRCRAFT DISPLAY UNIT

(75) Inventors: Daniel Y. Chiew, Marion, IA (US); Travis S. VanDerKamp, Marion, IA (US); John C. Frank, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 438 days.

(21) Appl. No.: 12/286,046

(22) Filed: Sep. 26, 2008

(51) Int. Cl.
*G01C 21/00* (2006.01)

(52) U.S. Cl. ........... 340/974; 340/973; 340/975; 701/14

(58) Field of Classification Search .......... 340/973–975, 340/980; 701/4, 14; 345/618; 348/117
See application file for complete search history.

(56) References Cited

U.S. PATENT DOCUMENTS

| | | | | |
|---|---|---|---|---|
| 5,289,185 A | * | 2/1994 | Ramier et al. | 340/971 |
| 5,420,582 A | * | 5/1995 | Kubbat et al. | 340/974 |
| 5,798,713 A | * | 8/1998 | Viebahn et al. | 340/974 |
| 6,317,059 B1 | * | 11/2001 | Purpus et al. | 340/974 |
| 6,798,423 B2 | * | 9/2004 | Wilkins et al. | 345/618 |
| 7,603,209 B2 | * | 10/2009 | Dwyer et al. | 701/14 |
| 2003/0132860 A1 | * | 7/2003 | Feyereisen et al. | 340/973 |

* cited by examiner

*Primary Examiner* — Brent Swarthout (74) *Attorney, Agent, or Firm* — Matthew J. Evans; Daniel M. Barbieri (57) ABSTRACT

A present novel and non-trivial system, module, and method for presenting an abbreviated pathway on a tactical display unit. A processor generates an image data set representative of a pathway and a three-dimensional perspective scene outside the aircraft using terrain data, first location highlighter data, and second location highlighter data, where the first location highlighter data corresponds to the active flight path and second location highlighter data corresponds to a subsequent flight path. After being presented to a display system, an image represented in the image data set is presented on a tactical display unit, whereby an abbreviated pathway appears superimposed against the three-dimensional perspective scene outside the aircraft, where location highlighters are used for the depiction of the pathway comprising of at least one enhanced boundary of the active path, the second waypoint, the third waypoint, and the flight path formed between the second and third waypoints.

20 Claims, 7 Drawing Sheets

SYSTEM, SYSTEM, MODULE, AND METHOD FOR PRESENTING AN ABBREVIATED PATHWAY ON AN AIRCRAFT DISPLAY UNIT

BACKGROUND OF THE INVENTION

1. Field of the Invention

This invention pertains generally to the field of cockpit indicators or display units that provide flight information to the pilot or flight crew of an aircraft, and more particularly to highway in the sky ("HITS") pathway depictions on one or more display units providing an artificial horizon through a synthetic vision system ("SVS"), an enhanced vision system ("EVS"), a combined SVS-EVS vision system, and/or a vision system that may produce a classic electronic primary flight display ("PFD").

2. Description of the Related Art

Cockpit indicators may provide navigation and/or course information to a pilot which allows the pilot to determine if the aircraft is flying on course with a flight plan. Traditional or classic indicators have been driven using signals generated using ground-based navigation aids that are received by the aircraft. Data represented in the signals is used to provide course information to the pilot by depicting or providing vertical and/or horizontal bars (i.e., "needles") where the pilot is required to "fly the needles" to stay on course. If the aircraft was on course, the needles would be centered on the indicator.

With the existence of a satellite-based navigation system such as global positioning system ("GPS") and with the growing ability to depict the scene outside of the aircraft with a synthetic and/or enhanced image on a tactical display unit such as a PFD, there has been a trend in the aviation community to replace needles with a HITS pathway for providing course information. In one form, a HITS pathway comprises a "tunnel" where the pilot is required to "fly the tunnel" to stay on course.

The depiction of the tunnel is based on, in part, the flight plan between successive navigation fixes (e.g., waypoints) that may or may not have corresponding altitude constraints. A system such as a flight management system ("EMS") may receive the flight plan and generate flight plan data divided into lateral flight plan and vertical flight plan components from which a HITS pathway is generated.

Although a HITS pathway provides useful information and may improve situational awareness, situational awareness may still be attenuated if a HITS pathway clutters or obscures the presentation of other flight information on an aircraft display unit, especially if a HITS pathway is depicted as a wireframe and the aircraft is "flying the tunnel" and the wireframe HITS pathway symbols converge. Moreover, too much focus of "flying the tunnel" may provide a false sense of security to the pilot; it may lead to a pilot erroneously focusing on "staying in the tunnel" while neglecting other duties.

BRIEF SUMMARY OF THE INVENTION

A present novel and non-trivial system, module, and method for presenting an abbreviated pathway on a tactical display unit. The display unit presents an abbreviated pathway appears superimposed against the three-dimensional perspective scene outside the aircraft, where location highlighters are used for the depiction of the pathway comprising of at least one enhanced boundary of the active path, the second waypoint, the third waypoint, and the flight path formed between the second and third waypoints In one embodiment, a system is disclosed for presenting an abbreviated pathway on a tactical display unit. The system comprises a source of navigation data, a source of terrain data, a processor, and a display system. The processor could define a first location data set associated with an active flight path, a second location data set associated with a subsequent flight path, generate an image data set as a function of the terrain data, first location highlighter data, and second location highlighter data, where the first location highlighter data may be determined using a boundary enhancing function which causes the boundary to remain invisible unless the aircraft flies away from the centerline and/or towards a boundary. After the image data set has been generated, the processor could provide the image data set to a display system wherein an abbreviated pathway appears on a tactical unit display superimposed against the three-dimensional perspective scene outside the aircraft, where location highlighters are used for the depiction of a visible pathway as determined by the enhancing function, a second waypoint, and third waypoint, and a flight path between the second and third waypoints.

In another embodiment, a module is disclosed for presenting an abbreviated pathway on a tactical display unit. The module comprises, in part, the processor of the system and one or more processor functions.

In another embodiment, a method is disclosed for presenting an abbreviated pathway on a tactical display unit. The method comprises, in part, one or more functions performed by the processor of the system and module.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
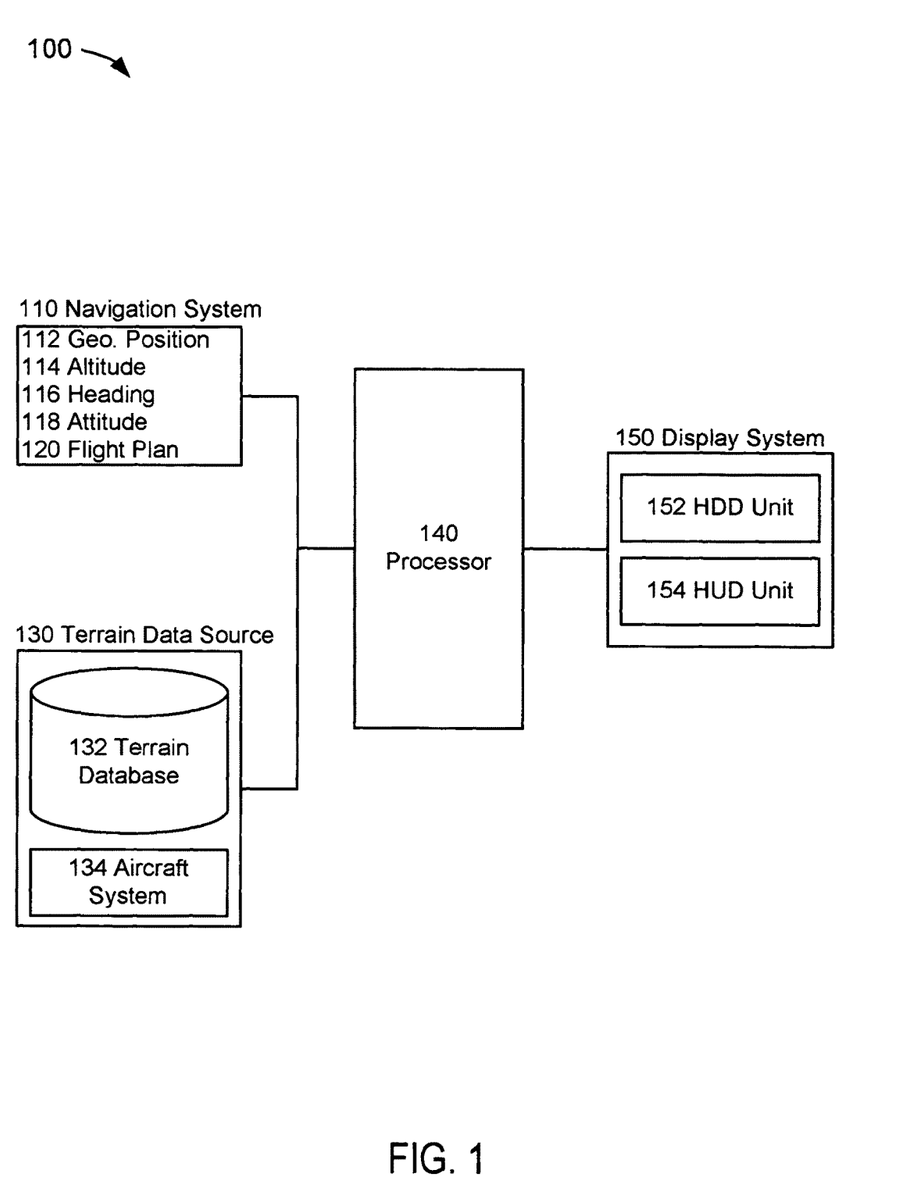
FIG. 1 depicts a block diagram of a system for presenting an abbreviated pathway on an aircraft display unit.

FIG. 1 depicts a block diagram of an abbreviated pathway presentation system 100 suitable for implementation of the techniques described herein. The abbreviated pathway presentation system 100 of an embodiment of FIG. 1 includes navigation system 110, a terrain data source 130, a processor 140, and a display system 150.

In the embodiment of FIG. 1, a navigation system 110 comprises the system or systems that could provide navigation data information in an aircraft. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), and a global navigation satellite system (or satellite navigation system), all of which are known to those skilled in the art. A navigation system 110 could provide navigation data including, but not limited to, geographic position 112, altitude 114, heading 116, and attitude 118. As embodied herein, aircraft position comprises geographic position (e.g., latitude and longitude coordinates), and heading may be derived from either geographic position, aircraft position, or both. As embodied herein, aircraft orientation may include pitch, roll, and/or yaw information related to the attitude of the aircraft. As embodied herein, a navigation system 110 could provide navigation data including, but not limited to, geographic position 112, altitude 114, heading 116, and attitude 118 to a processor 140 for subsequent processing as discussed herein. In an embodiment of FIG. 1, a navigation system could also include a flight management system ("FMS") 110 which could perform a variety of functions performed to help the crew in the management of the flight; these functions are known to those skilled in the art. These functions could include receiving a flight plan 120 and constructing a lateral and vertical flight plan from the flight plan 120. A flight plan 120 could comprise as a series of waypoints, and a waypoint could have an altitude constraint associated with it. A pilot may create a flight plan 120 from waypoints stored in a database or select a flight plan 120 stored in a database of the FMS. Also, a flight plan 120 may be modified at any time.

As embodied herein, a waypoint is not limited to an Area Navigation ("RNAV") waypoint but could include any navigation fix having an ascertainable location and used for navigation including, but not limited to, RNAV waypoints, ground-based navigation facilities such as VHF and NDB NAVAIDs, and navigation fixes defined using one or more ground-based navigation facilities. As embodied herein, a waypoint could include any location and/or fix defined, considered, described, and/or typed as a waypoint under ARINC Specification 424-18 entitled "Navigation Systems Data Base" published by ARINC Incorporated or Federal Aviation Administration ("FAA") Order 8260.19D entitled "Flight Procedures and Airspace" and dated Aug. 27, 2007 which references the waypoint descriptors codes of ARINC 424 specification in Appendix 13. At the time of this writing, the Order may be obtained on the Internet at http://www.faa.gov/about/office_org/headquarters_offices/avs/offices/afs/afs400/afs420/policies_guidance/orders.

In a lateral flight plan, the FMS could perform many functions including, but not limited to, navigational computations, radio navigation aids selections, and providing lateral flight information which could maintain the aircraft along the flight plan from takeoff to approach. In a vertical flight plan, an FMS could compute an optimum speed at each point, other characteristic speeds, and the aircraft weight and center of gravity. Then, it could compute predictions along the flight plan based on these speeds and weight. It could also provide vertical flight information in reference to such predictions. Other miscellaneous performance computations are also made. Computations and underlying algorithms performed by an FMS are known to those skilled in the art.

A pilot or flight crew may initialize an FMS including, but not limited to, the selection of a flight plan 120, where such flight plan could provide the basis for all computations and displays. A flight plan 120 may be composed of various lateral and vertical elements that may be defined during initialization, and may be defined from information navigation data information stored in an FMS database.

Lateral elements of a flight plan 120 could include origin airport and runway; a departure procedure ("DP") that may include, but is not limited to, a standard instrument departure ("SID"); an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and a holding procedure; and a flight plan to an alternate airport. Such procedures may be defined by various legs and waypoints between legs.

Vertical elements of a flight plan 120 could include a takeoff altitude which may include, but is not limited to, a thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels.

As noted above, a flight plan 120 may be changed or revised at any time after initialization. For lateral elements, waypoints could be inserted or deleted, holding procedures could be inserted or modified, legs to fly directly to waypoints may be inserted, a DP or STAR procedure may be modified or introduced into the flight plan, the destination or alternate airport may be changed, and/or an offset path could be created to avoid hazardous meteorological conditions. For vertical elements, constraints associated with altitude, vertical speed, flight path angle, and speed between waypoints could be inserted, modified, or deleted; climb and descent speeds could be inserted, modified, or deleted as well as climb and descent step legs. As embodied herein, a navigation system 110 could provide data representative of navigation data to a processor 140 for subsequent processing as discussed herein.

In the embodiment of FIG. 1, a terrain data source 130 could comprise any source of terrain data, obstacle data, other manmade or natural features, geopolitical boundaries, or any combination thereof. As embodied herein, a terrain data source 130 may include, but is not limited to, a terrain database 132 and other aircraft systems 134 which could employ terrain data. A terrain database 132 may be any database used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a cell defined in arc-seconds of latitude and longitude, or a grid may be rectangular, square, hexagonal, or circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 132 and a database of a navigation system 110 (e.g., FMS database) may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle in terrain database 132 could be stored, a temporary runway closure in an airport database, and a temporary flight restriction in airspace database. Any database used in the embodiments disclosed herein may be a stand-alone database or a combination of databases. For example, a terrain database 132 may be associated with a terrain awareness and warning system ("TAWS") only. In an alternative embodiment, terrain data could be stored in a database used by any other aircraft system 124 and 134 including, but not limited to, a database associated with a flight management computing system and an airspace awareness and warning system ("AAWS"). An example of a TAWS and an AAWS which utilize airport and airspace databases are described in U.S. patent application Ser. Nos. 12/069,234 and 12/069,319, respectively, each of which is incorporated by reference in its entirety Although other aircraft systems 134 could employ terrain databases 132, such systems could also be a source of terrain data provided to a processor 140. For example, a synthetic vision system ("SVS") may employ a terrain database to generate terrain image data. Here, the terrain database that is part of an SVS could be the source of terrain data in system 100. Alternatively, the SVS could provide a processor 140 with terrain data in the form of terrain image data. In another alternative, an Enhanced Vision System ("EVS") could provide terrain data in the form of terrain image data. In another alternative, a combined SVS and EVS could provide terrain data in the form of terrain image data. Other examples of other aircraft systems 134 which could comprise sources of terrain data include, but are not limited to, a TAWS and an AAWS. As embodied herein, a terrain database 132 and other aircraft systems 134 could provide terrain data to a processor 140 for subsequent processing as discussed herein.

In an embodiment of FIG. 1, a processor 140 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A processor 140 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, a processor 140 could be a processor(s) used by or in conjunction with any other aircraft system, panel, module, and/or component of the aircraft including, but not limited to, a processor(s) existing in a navigation system 110, a terrain data source 130, a display system 150, an SVS, an EVS, a combined SVS-EVS, or any combination thereof.

A processor 140 may receive input data from various system(s), panel(s), module(s) and/or component(s) including, but not limited to, a navigation system 110 and a terrain data source 120. Such inputs could include, but are not limited to, data representative of a aircraft position and attitude, and a flight plan 120, and data representative of an object including, but not limited to, terrain and obstacle information. A processor 140 may be electronically coupled to systems and/or sources to facilitate the receipt of input data; as embodied herein, operatively coupled may be considered as interchangeable with electronically coupled. A processor 140 may provide output data to various systems and/or units including, but not limited to, a display system 150. A processor 140 may be electronically coupled to systems and/or units to facilitate the providing of output data. It is not necessary that a direct connection be made; instead, such receipt of input data and the providing of output data could be provided through a data bus or through a wireless network.

In the embodiment of FIG. 1, an indicating system 150 may receive image data from a processor 140. The indicating system 150 could include any unit that provides symbology of tactical flight information including, but not limited to, a Head-Down Display ("HDD") unit 152 and/or a Head-Up Display ("HUD") unit 154.

An HDD unit 152 may present tactical information to the pilot or flight crew—information relevant to the instant or immediate control of the aircraft, whether the aircraft is in flight or on the ground. An HDD unit 152 is typically a unit mounted to an aircraft's flight instrument panel located in front of a pilot and below the windshield and the pilot's field of vision. An HDD unit 152 displays the same information found on a primary flight display ("PFD"), such as "basic T" information (i.e., airspeed, attitude, altitude, and heading). Although it provides the same information as that of a PFD, an HDD unit 152 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. An HDD unit 152 is designed to provide flexible configurations which may be tailored to the desired configuration specified by a buyer or user of the aircraft. In an embodiment of FIG. 1, one or more locations depicted in a three-dimensional terrain image on an HDD unit 152 may be enhanced using location highlighters as disclosed herein.

HUD unit 154 provides tactical information to the pilot or flight crew, in the pilot's forward field of view through the windshield, eliminating transitions between head-down to head-up flying. Similar to an HDD unit 152, a HUD unit 154 may be tailored to the desired configuration specified by a buyer or user of the aircraft. As embodied herein, an HDD unit 152, a HUD unit 154, or both could receive an image data set from a processor 140 for subsequent presentation.

The drawings of FIG. 2 provide depictions of how pathways could be presented on an HDD unit 152; the same depicted pathways may be presented on a HUD unit 144 using the embodiments disclosed herein. FIG. 2A provides an illustration on an HDD unit 152 depicting an example of a HITS pathway as indicated by a beginning 202 and an end 204. Also, a location highlighter of an airport 206 is depicted; location highlighters are discussed in detail below. The HITS pathway and location highlighter are shown with symbology of tactical flight information against the backdrop of a sky/ground artificial horizon. As depicted, a HITS pathway may use outer boundaries to provide lateral and/or vertical boundaries within which a pilot could fly to stay course as determined by a flight plan. The lateral and vertical dimensions of the boundaries may be configurable by a manufacturer or end-user and may be fixed and/or variable.

Figure 2A:
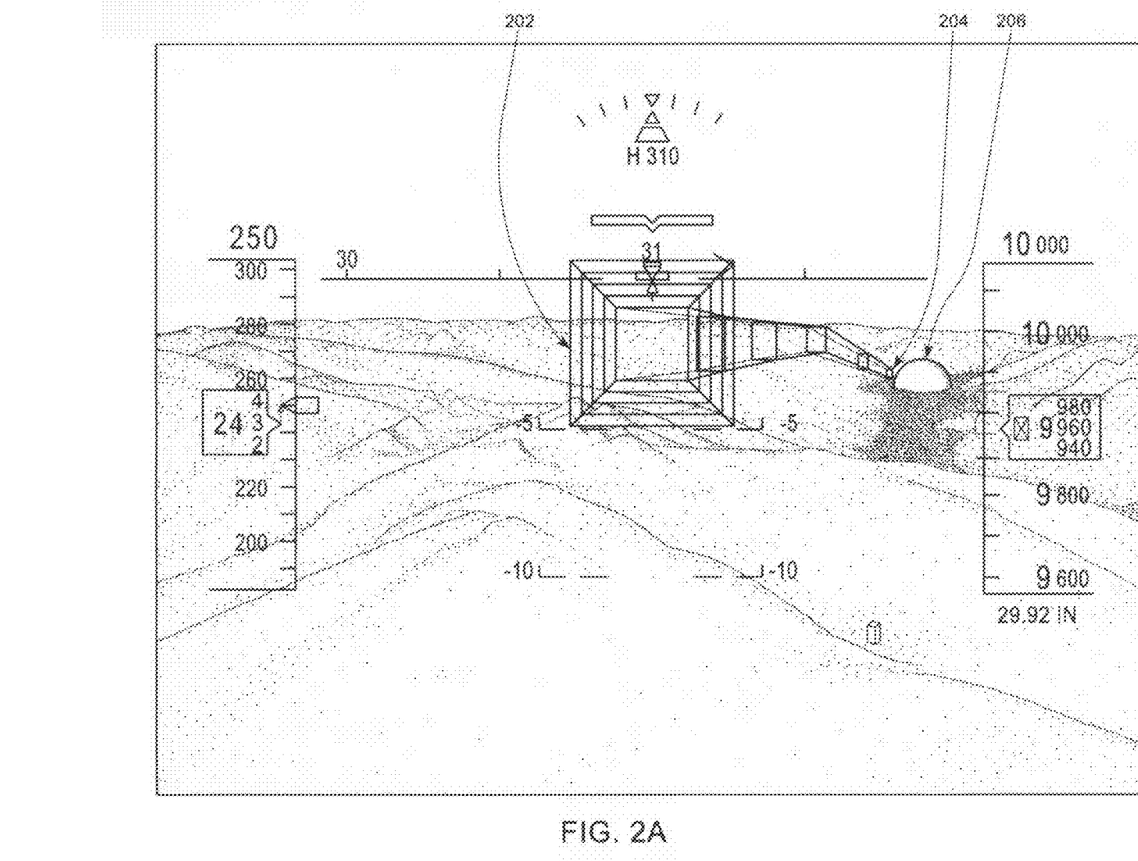
FIG. 2A depicts an example of a HITS pathway presented on an aircraft display unit.

The image presented on the face of an HDD unit 152 may be a representation of a scene outside the aircraft as viewed by the pilot. As observed, a HITS pathway could clutter the image depicted on a tactical display unit and blend in with the presentation of symbology. It should be noted that the symbology depicted on the HDD unit 152 shown in FIG. 2A has been made minimal intentionally for the sake of presentation and is not indicative of the plurality of indications or information with which it may be configured. Because the indications or information shown in FIG. 2A are well-known to those skilled in the art, a discussion of the specific tactical information shown in FIG. 2A is not provided herein.

Figure 2B:
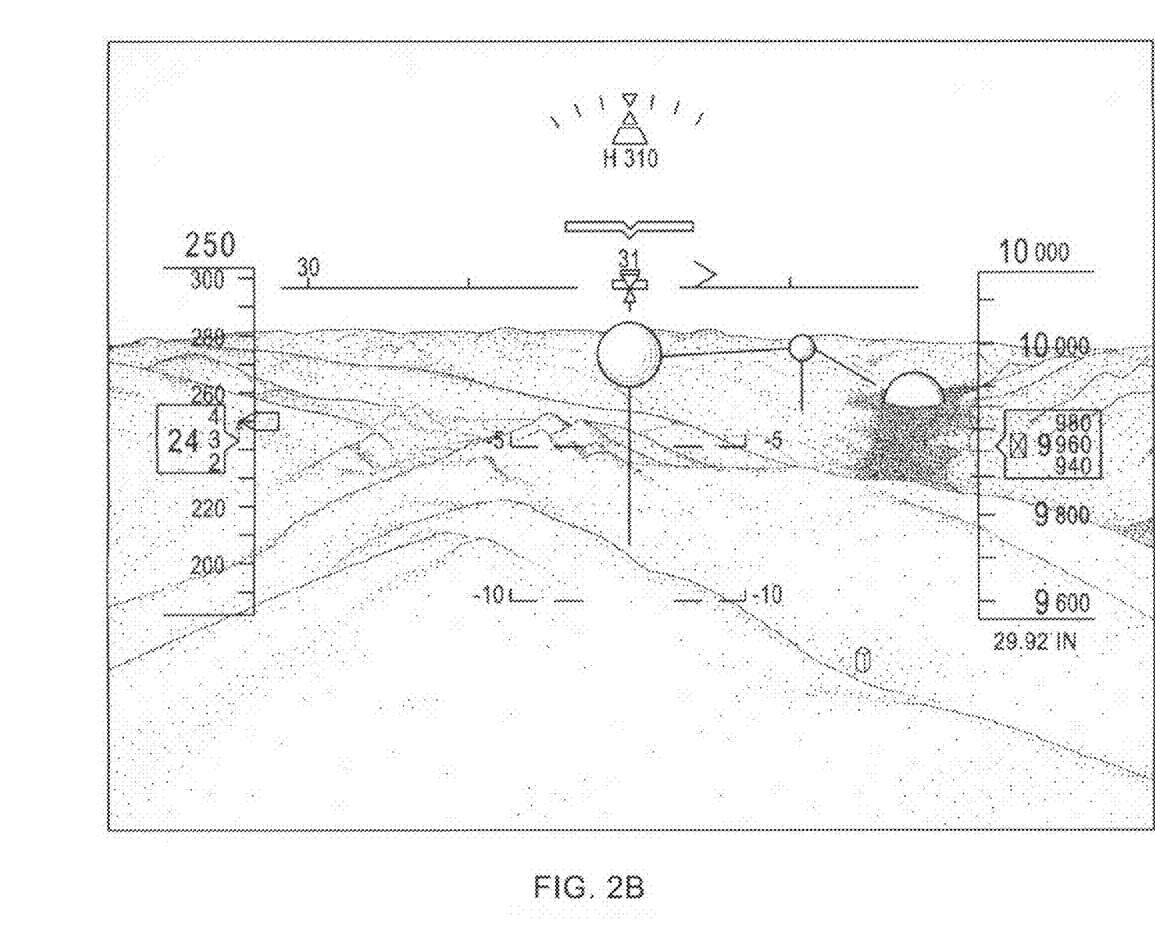
FIG. 2B depicts an example of an abbreviated pathway with tactical flight symbology presented on an aircraft display unit.

The advantages and benefits of the embodiments discussed herein may be illustrated by showing example depiction of a pathway comprising two waypoints and a flight path between the waypoints. FIG. 2B provides an illustration on an HDD unit 152 depicting an example of symbology and an abbreviated pathway as disclosed and embodied herein against the backdrop of a sky/ground artificial horizon, and FIG. 2C provides an example of the depiction shown in FIG. 2B without the presentation of the symbology.

Figure 2C:
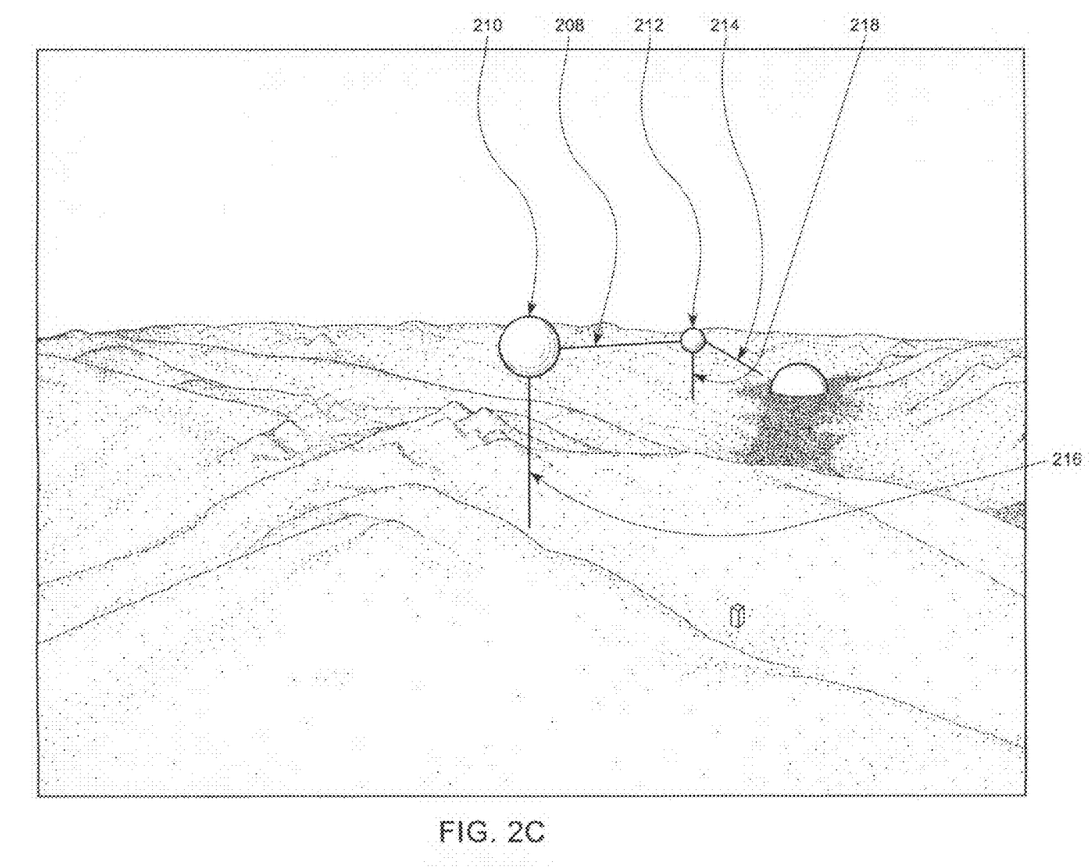
FIG. 2C depicts an example of the abbreviated pathway of FIG. 2B without tactical flight symbology presented on an aircraft display unit

As depicted in FIG. 2C, a flight path 208 may be depicted between waypoints 210 and 212 as a line which may be straight or curved to replicate, for instance, a great circle between the waypoints; alternatively, a flight path 214 may be depicted as extending from a waypoint 212. Ground position indicators 216 and 218 may extend from waypoints 210 and 212, respectively, to indicate the ground positions of the waypoints. In addition, ground position indicators 216 and 218 could be employed as a scale made up of evenly spaced tick marks from which a pilot could estimate the height above the ground of the waypoint.

A waypoint 210 could serve as an originating point of a subsequent flight path 208 of abbreviated pathway, and a waypoint 212 could serve as a terminating point of the flight path 208. A waypoint 210 could be the next waypoint that the aircraft will encounter along a flight plan from its current position, and waypoint 212 could be the successive waypoint to waypoint 210 or a subsequent waypoint along the flight plan comprised of subsequent waypoints. For an aircraft currently operating along an active flight plan, waypoint 210 could also serve as a terminating point of the active flight path.

Waypoints may be depicted as objects with enhancing effects; as illustrated in FIG. 2B, waypoint 210 is magenta and waypoint 212 is grayish-silver, and both are depicted as three-dimensional spheres. Although spherical objects may be used, a plurality of highlighters is available or configurable to a manufacturer or end-user for enhancing the location of each waypoint. Those skilled in the art will appreciate the ability and ease with which executable software code may be reprogrammed or modified by a manufacturer or end-user to facilitate a configuration of highlighting symbology selected by a manufacturer or end-user without affecting or expanding the scope of the embodiments discussed herein. In the following paragraphs, other examples of criteria and performance factors are provided to illustrate the ability with which a manufacturer or end-user may define one or more highlighters as embodied herein. These illustrations are intended to provide examples of illuminating or highlighting symbology that may be used for waypoints, and are not intended to provide a limitation or an exhaustive list of the embodiments discussed herein.

A use of highlighters for identifying locations has been addressed by in U.S. patent application Ser. No. 12/080,120 entitled "System, Apparatus, and Method for Enhancing the Image Presented on an Aircraft Display Unit through Location Highlighters" which is hereby incorporated by reference in its entirety. The object characteristics of a location highlighter could depend on the object. For example, an object could be associated with a shape. As stated above, waypoints 210 and 212 are depicted as three-dimensional spheres in FIG. 2B. In another example, waypoints 210 and 212 could be depicted as cubes, pyramids, or any other three-dimensional object suitable for depicting objects. In another example, waypoints 210 and 212 could be depicted as three-dimensional objects that resemble previous two-dimensional depictions of waypoints depicted on traditional or classic PFDs or navigation displays. In another example, a bowling pin could be used to indicate a VOR NAVAID used as a waypoint because such facility resembles one. In another example, an object characteristic of a waypoint, flight path, ground position indicator, and/or boundary (discussed below) could be selected so that such characteristic sufficiently contrasts or made conspicuous with not only the background of a three-dimensional perspective scene outside the aircraft but also other symbology such as, but not limited to, tactical flight information, a flight director and/or flight path vector.

A location highlighter for waypoints 210 and 212 could include enhancing effects such as, but not limited to, shading, transparency, translucency, opacity, texture-mapping, bump-mapping, fogging, shadowing, patterns, colors, or any combination thereof. For example, the "outer surfaces" of waypoints 210 and 212 are depicted as layered surfaces with partial shading. In another example, dynamic transparency could be one of a plurality of enhancing effects for location highlighter, where a location highlighter could begin fading away as the aircraft approaches a waypoint 210 by, for example, varying the level or degree of such enhancing effect as a function of distance. The utilization and employment of object characteristics and/or enhancing effects are known to those skilled in the art.

On a display unit capable of displaying colors, a location highlighter could be enhanced by color on a display where colors may be presented, and such color could depend on the distance between a waypoint and the aircraft, where each color could represent a specific range to the object. In another example, each waypoint depicted in the scene could be shown in a different color from the others appearing in the scene; as stated above, waypoint 210 is magenta in color, and waypoint 212 is grayish-silver. In another example, a location highlighter could remain steady or flash intermittently, where such flashing could depend on the distance between a waypoint and the aircraft, where such flashing could represent a specific range to the waypoint. Each of these examples are intended to provide an example of enhancements which highlight the locations of waypoints, and are not intended to provide a limitation or an exhaustive list to the embodiments discussed herein.

A location highlighter could also include alpha-numeric waypoint identifier and/or altitude information within the illuminating symbology. Generally, an aviation regulatory authority or organization possesses the authority of establishing and providing locations and corresponding location identifiers associated with a navigation fix. In the United States, the FAA establishes and provides location identifiers for navigation fixes such as, but not limited to, waypoints. For instance, FAA Order JO 7350.8D entitled "Location Identifiers" dated Jun. 5, 2008 provides a list of authorized location identifiers. At the time of this writing, the Order may be obtained on the Internet at http://www.faa.gov/airports_air-traffic/air_traffic/publications/. It should be noted that the embodiments herein are neither limited nor restricted to the location identifiers employed in the United States or those with governing oversight of the FAA. It is known to those skilled in the art that aviation governing authorities throughout the world may establish and provide location identifiers for navigation fixes unique to their respective jurisdictions.

In another embodiment, a location marker could be employed with the waypoint to provide identifier and/or altitude information. A use of location markers for waypoints has been addressed in U.S. patent application Ser. No. 12/217,342 entitled "System, Apparatus, and Method for Generating Location Information on an Aircraft Display Unit Using Location Markers" which is hereby incorporated by reference in its entirety. The use of such alpha-numeric waypoint identifier and/or location marker could be configurable or optional to the manufacturer or end-user.

As shown in FIG. 2C, the shape of a flight paths 208 and 214 and ground position indicators 216 and 218 are depicted as a solid, straight lines; however, these may not limited to solid, straight lines. As embodied herein, any means for depicting a line could be used including, but not limited to, the use of dashes and dots to depict dashed and dotted lines, respectively. Moreover, if a line is used, it is not limited to a straight line; as stated above, it could be a curved line. In another example, the widths or weights of lines could be range from thin to thick. In another example, a line could be generated to appear two- or three-dimensional. Flight paths 208 and 214 and ground position indicators 216 and 218 are not limited to lines. As embodied herein, these could be comprised of arrows, pointers, or any other object suitable for depicting flight paths and/or ground position indicators.

Figure 2D:
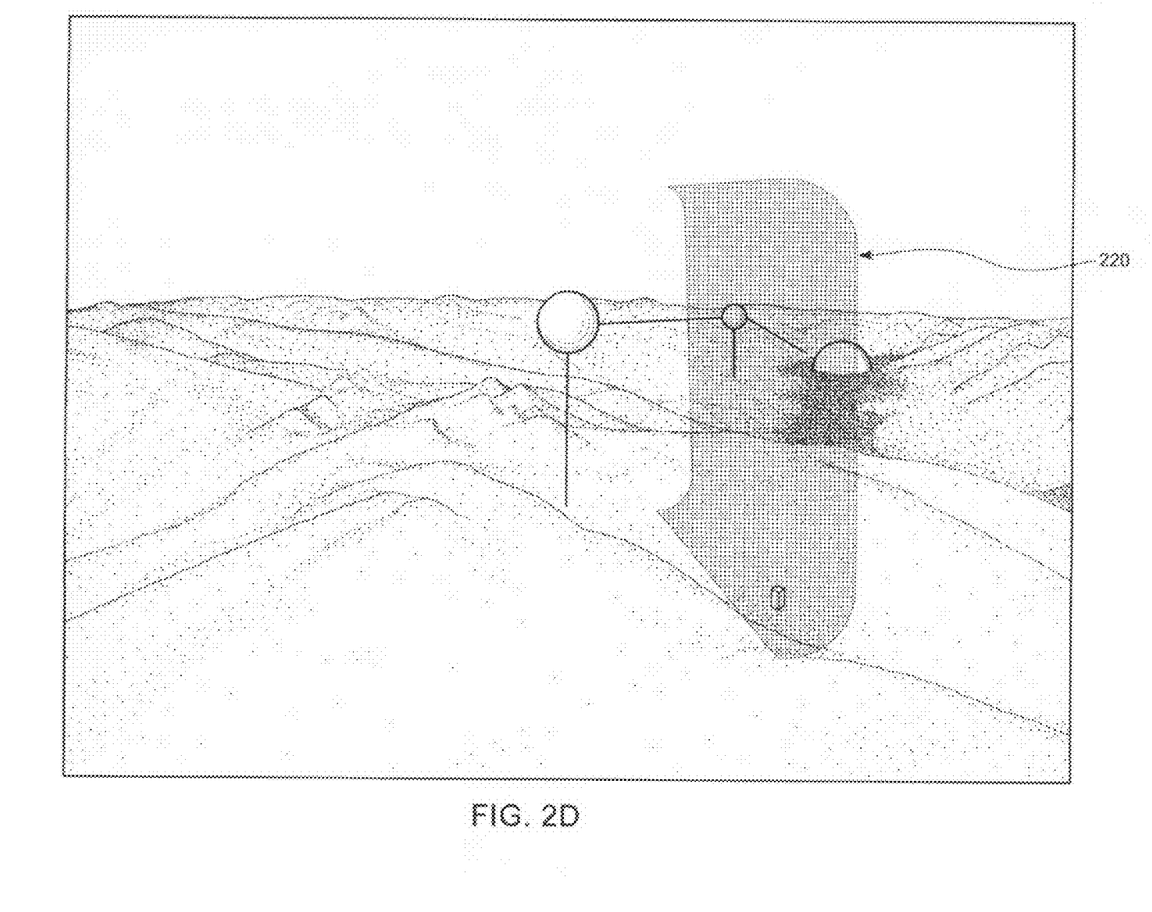
FIG. 2D depicts an example of the abbreviated pathway of FIG. 2B depicted with a lateral boundary.

The advantages and benefits of the embodiments discussed herein may be illustrated by showing examples depiction of an abbreviated pathway that comprises a lateral boundary of the active flight path of the flight plan as embodied herein. As shown in FIG. 2D, a boundary 220 may provide lateral guidance. It should be noted that although a lateral boundary is depicted in FIG. 2D, the discussion herein regarding boundaries apply equally to vertical boundaries. As stated above, a HITS pathway may use boundaries to provide lateral and/or vertical boundaries within which a pilot could fly to stay course as determined by a flight plan, where such boundaries are continuously visible.

As embodied herein, lateral and/or vertical guidance may be provided on an "as-needed" basis by boundaries that are not continuously visible. If an aircraft is operating on the centerline of the active flight path between previous and next waypoints, then lateral guidance may not be needed, and a lateral boundary of an abbreviated pathway may not be illuminated. If an aircraft flies or strays away from the centerline, a lateral boundary may be illuminated. Similarly, if an aircraft is operating at the correct altitude, then vertical guidance may not be needed, and a vertical boundary of an abbreviated pathway may not be illuminated. If an aircraft flies or strays away from the correct altitude, a vertical boundary may be illuminated.

Figure 2E:
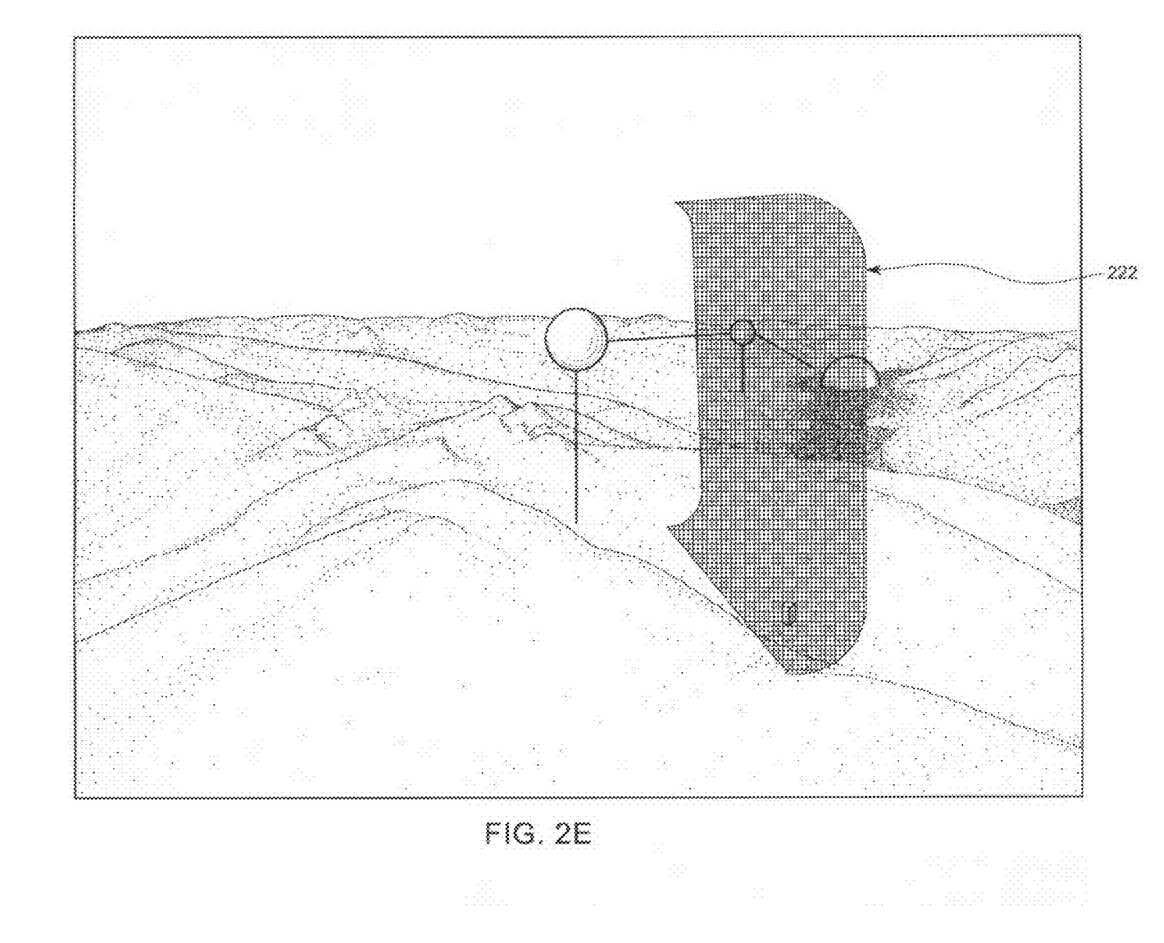
FIG. 2E depicts an example of the abbreviated pathway and lateral boundary of FIG. 2D where the lateral boundary is less transparent.

As embodied herein, location highlighters could be used to highlight a boundary of an active flight path; as such, enhancing effects could be applied to a boundary. For instance, the degree, amount, and/or intensity of illumination or use of any other enhancing effect such as, but not limited to, dynamic transparency may depend on a boundary enhancing function. For example, a boundary enhancing function could vary depending on the distance from the centerline, where a boundary could appear to fade-in as the aircraft flies away from a centerline and appear to fade-out or dissolve as the aircraft flies towards the centerline. In another example, a boundary enhancing function could vary depending on the distance from a boundary, where a boundary could appear to fade-in as the aircraft flies towards the boundary and appear to fade-out or dissolve as the aircraft flies away from the boundary towards the centerline. In another example, a boundary enhancing function could vary depending on a closure rate between the aircraft and boundary, where closure rate may be determined using data provided by a navigation system 110. As shown in FIG. 2E, a boundary 222 has become less transparent indicative of an aircraft that has flown away from the centerline and towards the boundary 222.

On a display unit capable of displaying colors, a boundary could be enhanced by color, where such color could depend on the distance between a centerline and the aircraft. For example, a boundary enhancing function could vary depending on the distance from the centerline, where a boundary could change to amber or yellow to warn the pilot of an approaching boundary and/or change to red to warn the pilot of an approaching boundary.

The locations of lateral and/or vertical boundaries may depend on the lateral and/or vertical dimensions assigned or configured by a manufacturer or end-user. In one embodiment, dimension(s) may be fixed as determined by a manufacturer or end-user. In another embodiment, dimension(s) may be variable depending one or more parameters selected by a manufacturer or end-user. For example, one parameter could depend on a phase of flight, i.e., take-off, departure, en route, arrival, and/or approach. In another example, a parameter could be associated within a specific phase of flight; for instance, lateral and/or vertical approach dimensions associated with a specific approach procedure could vary within the approach procedure, where boundaries become narrower as an aircraft continues towards the runway reflecting increasingly smaller lateral course widths and/or vertical course heights. In another embodiment, the width and/or height of the lateral and/or vertical boundaries may depend on the lateral and/or vertical dimensions assigned to a pathway.

In another example, one or more parameters could be associated with laterally and/or vertically protected airspace designated by an aviation-governing authority. Generally, an aviation regulatory authority or organization possesses the authority of designing and designating instrument approach and departure procedures. In the United States, the FAA establishes and provides definitions and ascertainable dimensions of instrument approach and departure procedures. For instance, FAA Order 8260.3B entitled "United States Standard for Terminal Instrument Procedures (TERPS)" and dated May 15, 2002 provides criteria used to formulate, review, approve, and publish procedures for instrument approach and departure of aircraft to and from civil and military airports. Also, FAA Order 8260.54A entitled "The United States Standard for Area Navigation (RNAV)" provides criteria for obstacle clearance evaluation of RNAV approach procedures, e.g., Localizer Performance with Vertical Navigation ("LPV"), Lateral Navigation ("LNAV"), Lateral NavigationNertical Navigation ("LNAVNNAV"), and Localizer Performance ("LP"). The criteria in FAA Order 8260.54A support adding an instrument approach system ("ILS") line of minimum to an RNAV (GPS) approach procedure using LPV construction criteria at runways served by an instrument landing system. Also, FAA Order 8260.19D stated provides guidance for the administration and accomplishment of the FAA Flight Procedures and Airspace Program. At the time of this writing, these Orders may be obtained on the Internet at http://www.faa.gov/about/office_org/headquarters_offices/ays/offices/afs/afs400/afs420/poli cies_guidance/orders.

Also, FAA Order JO 7400.2G entitled "Procedures for Handling Airspace Matters" and dated Apr. 10, 2008 prescribes policy, criteria, guidelines and procedures associated with airspace allocation and utilization, obstruction evaluation, obstruction marking and lighting, airport airspace analysis, and management of air navigation aids. The Order includes, but not limited to, the subjects of base altitudes, minimum en route altitudes, waypoint criteria, laterally-protected airspace criteria for RNAV en route segments, and en route turn criteria. At the time of this writing, this Order may be obtained on the Internet at http://www.faa.gov/airports_airtraffic/airtraffic/publications.

The discussion herein may be drawn to these FAA standards for the only purpose of simplifying the illustration and discussion of possible parameters that may be used by a manufacturer or end-user in configuring the disclosed embodiments herein; however, the embodiments are neither limited nor restricted to the design and/or designation criteria employed in the United States or those with governing oversight of the FAA. It is known to those skilled in the art that aviation governing authorities throughout the world may develop or may have developed criteria unique to their respective jurisdictions which may or may not employ similar design and/or designation criteria, and end users of navigational data could develop criteria directed to unique operational requirements that may or may not require special equipment or authorization. Furthermore, it is known to those skilled in the art that such standards may be subjected to future revisions, additions, and/or amendments and appreciate the ability and ease with which executable software code may be reprogrammed or modified by a manufacturer or end-user to facilitate such revisions, additions, and/or amendments. The embodiments disclosed herein could include any defined airspace in which a flight plan may be flown from which an abbreviated pathway may be generated.

Figure 3:
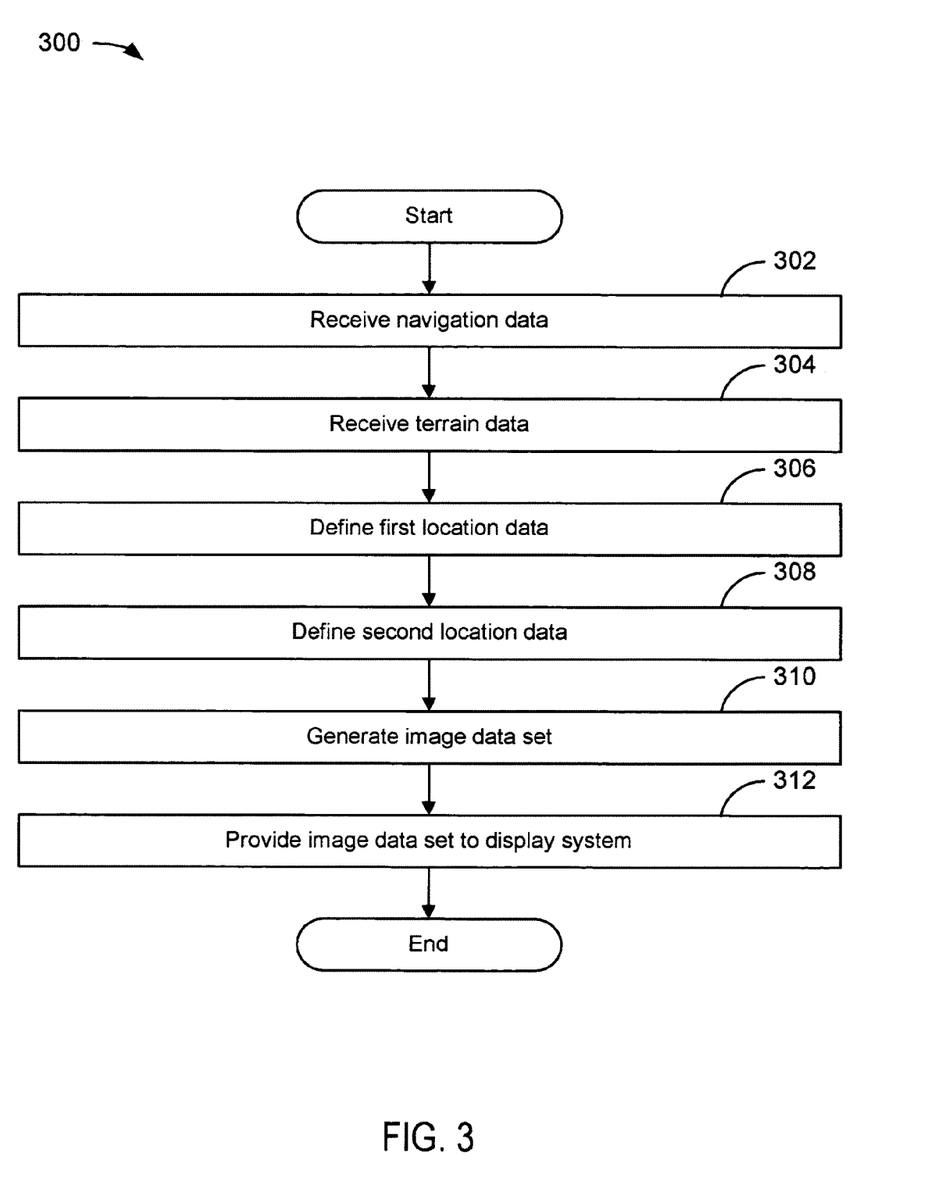
FIG. 3 provides a flowchart illustrating a method for presenting a three-dimensional perspective terrain on an aircraft display unit.

FIG. 3 depicts a flowchart 300 of an example of a method for presenting an abbreviated pathway on a tactical display unit. The flowchart begins with module 302 with the receiving of navigation data by a processor 140 including data representative of a flight plan and aircraft position and attitude in flight. A processor 140 could be programmed to receive the navigation data could be provided by a navigation system 110 to a processor 140, and position could comprise of geographic position (e.g., latitude and longitude coordinates) and altitude. As embodied herein, the receiving of data by a processor or the providing of data to a processor may include a step in which the processor performs a retrieval operation of such data. As embodied herein, a change in aircraft position could be used to determine the heading or direction of a scene outside the aircraft The flowchart continues with module 304 with the receiving of terrain data. A processor 140 could be programmed to receive terrain data from a terrain data source 120. In one embodiment, terrain data of a scene outside the aircraft could be provided by a terrain database. In another embodiment, terrain data could be provided by other aircraft systems or components thereof including, but not limited to, an SVS, an EVS, a combined SVS-EVS, and a TAWS.

The flowchart continues with module 306 with the defining of first location data. A processor 140 could be programmed to define first location data could represent boundaries of an active path between a first waypoint and a second waypoint on the flight plan, where the first waypoint could be a preceding or previous waypoint and the second waypoint could be the next waypoint, which could also be a terminating waypoint of an active flight path. Boundaries could include lateral boundaries and/or vertical boundaries. As embodied herein, boundaries may be configured and/or selected by a manufacturer or end-user. In another embodiment, boundaries may be fixed, variable, or both. In another embodiment, variable boundaries may be determined a function of one or more parameters, where such parameter(s) could be associated with standards and/or criteria published by an aviation-governing authority including, but not limited to, the FAA. In another embodiment, The flowchart continues to module 308 with the defining of second location data. A processor 140 could be programmed to define second location data could represent the second waypoint and a third waypoint of a flight plan. Second location data may also represent a flight path formed between the second and third waypoints. In another embodiment, any waypoint could include a ground position indicator. In another embodiment, one or more waypoints subsequent to a third waypoint more form subsequent flight paths along the flight plan.

The flowchart continues to module 310 with the generation of an image data set representative of a pathway and a three-dimensional perspective scene outside the aircraft comprising of terrain data, first location highlighter data, and second highlighter data. In an embodiment herein, a processor 140 could be programmed to determine location highlighters associated with each boundary, waypoint, and flight path. Also, a location highlighter for each ground position indicator depicted on a display unit could be determined. In another embodiment herein, a processor could be programmed with a boundary enhancing function. As discussed above, a processor 140 may be programmed with a boundary enhancing function, where such function may enable the visible depiction of a lateral and/or vertical boundary based on the distance between the aircraft position and a centerline of the active path, the distance between the aircraft position and a boundary, a closure rate, or a combination thereof, where closure rate may be determined using data provided by a navigation system 110. Moreover, such enhancing function may enable the visible depiction of both simultaneously if the aircraft position warrants a display of both such as, for example, an aircraft that is low and to the right or left of centerline or an aircraft that is high and to the right of left of centerline.

A processor 140 could determine highlighter data by determining the position where the highlighter would appear on the screen of a display unit; for example, a determination of the position made by a processor 140 could include a scaling component to convert "world space" to "screen space." Then, a processor 140 could then ensure that the highlighter data will provide a sufficient contrast with the three-dimensional perspective of the scene and flight information symbology. Then, the highlighter data could be combined with the terrain image data to form an image data set that will be provided to an HDD unit 152, a HUD unit 154, or both for presentation to a pilot or flight crew.

As embodied herein, an IG processor 150 could determine highlighter data associated with and/or representative of each object located in a scene outside the aircraft.

As discussed above, one or more location highlighters could be available and configurable to a manufacturer or end-user. In one embodiment, the appearance of each highlighter could depend on the object (e.g., airport, navigation facility, type of airspace, etc.). In another embodiment, each highlighter could appear as multi-dimensional. In another embodiment, the appearance of each highlighter could comprise enhancing effects. In another embodiment, each highlighter could be color-coded, where the use of colors could be based upon criteria such as, but not limited to, distance from the aircraft and type of object. In another embodiment, each highlighter could remain steady or flash intermittently. In another embodiment, each highlighter may include an identifier that could display an alpha-numeric identifier such as, but not limited to, ICAO and/or IATA airport identifiers The flowchart continues to module 312 with the providing of an image data set to a display system for display of an image represented therein. Such image data set may be representative of an image depicting an abbreviated pathway that appears to be superimposed against the three-dimensional perspective scene outside the aircraft. As embodied herein, location highlighters may be used to depict a pathway comprising of at least one enhanced boundary if the boundary enhancing function has made such determination, the second waypoint, the third waypoint, and the flight path formed between the second and third waypoints. In one embodiment, a display unit could comprise an HDD unit. In another embodiment, a display unit could comprise a HUD unit. In an additional embodiment, a display unit could present an image upon receipt of an image data set, whereby the location of each object appearing in a scene outside the aircraft is enhanced with a location highlighter. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting an abbreviated pathway on a tactical display unit, such system comprising:
a source of navigation data;
a source of terrain data;
a processor configured to
receive navigation data representative of a flight plan and aircraft position and attitude,
receive terrain data corresponding to the navigation data,
define first location data representative of at least one boundary of an active flight path originating at a preceding waypoint and terminating at the next waypoint of the flight plan,
define second location data representative of the next waypoint of the flight plan, a first successive waypoint of the flight plan, and an approaching flight path originating at the next waypoint and terminating at the first successive waypoint of the flight plan,
generate an image data set representative of an abbreviated pathway and a three-dimensional perspective scene outside the aircraft, wherein
the image data set is generated as a function of the terrain data, first location highlighter data associated with the first location data, and second location highlighter data associated with the second location data, further wherein
the first location highlighter data is determined using a boundary enhancing function, and
provide the image data set to a display system; and
the display system configured to
receive the image data set, and
present an image represented in the image data set on a tactical display unit, whereby
the abbreviated pathway appears on the tactical display unit superimposed against the three-dimensional perspective scene outside the aircraft, where the abbreviated pathway comprises
a plurality of boundaries of the active path, where the location of each boundary is highlighted with a variable-visibility three-dimensional location highlighter,
the next waypoint, the location of which is highlighted as a three-dimensional location highlighter,
the first successive waypoint, the location of which is highlighted as a three-dimensional location highlighter, and
the approaching flight path, depicted as a straight or curved first connector between the location highlighters of the next waypoint and the first successive waypoint, where such first connector is depicted with an originating end at the next waypoint and a terminating end at the first successive waypoint.

2. The system of claim 1, wherein the data source for providing terrain data comprises a terrain database, an aircraft system, or both.

3. The system of claim 1, wherein the processor is incorporated into an existing avionics system.

4. The system of claim 3, wherein the existing avionics system includes a navigation system, a system which provides terrain data, a vision system, or a display system.

5. The system of claim 1, wherein the processor is configured to include in the definition of the second location data at least one second successive waypoint beyond the first successive waypoint and at least one additional flight path, where each additional flight path is formed between successive waypoints, such that
the abbreviated pathway is further comprised of
at least one second successive waypoint depicted as a location highlighter, and
at least one additional flight path depicted as a straight or curved second connector between the location highlighters of the successive waypoints, where such second connector is depicted with an originating end and a terminating end.

6. The system of claim 1, wherein the highlighter data includes data associated with object characteristics, enhancing effects, or a combination of both.

7. The system of claim 1, wherein the boundary enhancing function is a function of the distance between the aircraft position and a centerline of the active path, the distance between the aircraft position and a boundary, a closure rate, or a combination thereof.

8. The system of claim 1, wherein the abbreviated pathway includes at least one straight and vertical ground position indicator originating and extending downward from the location highlighter of one waypoint.

9. A module for presenting an abbreviated pathway on a tactical display unit, such module comprising:
    an input communications interface to facilitate the receiving of data from at least one data source by a processor;
    the processor configured to
        receive navigation data representative of a flight plan and aircraft position and attitude,
        receive terrain data corresponding to the navigation data,
        define first location data representative of at least one boundary of an active flight path originating at a preceding waypoint and terminating at the next waypoint of the flight plan,
        define second location data representative of the next waypoint of the flight plan, a first successive waypoint of the flight plan, and an approaching flight path originating at the next waypoint and terminating at the first successive waypoint of the flight plan,
        generate an image data set representative of an abbreviated pathway and a three-dimensional perspective scene outside the aircraft, wherein
            the image data set is generated as a function of the terrain data, first location highlighter data associated with the first location data, and second location highlighter data associated with the second location data, further wherein
            the first location highlighter data is determined using a boundary enhancing function, and
        provide the image data set to a display system for presenting an image represented in the image data set on a tactical display unit, whereby
            an image of an abbreviated pathway appears on the tactical display unit superimposed against the three-dimensional perspective scene outside the aircraft, where the abbreviated pathway comprises a plurality of boundaries of the active path, where the location of each boundary is highlighted with a variable-visibility three-dimensional location highlighter,
            the next waypoint, the location of which is highlighted as a three-dimensional location highlighter,
            the first successive waypoint, the location of which is highlighted as a three-dimensional location highlighter, and
            the approaching flight path, depicted as a straight or curved first connector between the location highlighters of the next waypoint and the first successive waypoint, where such first connector is depicted with an originating end at the next waypoint and a terminating end at the first successive waypoint; and
    an output communications interface to facilitate the providing of the image data set to the display system.

10. The module of claim 9, wherein the module is incorporated into an existing avionics system.

11. The module of claim 10, wherein the existing avionics system includes a navigation system, a system which provides terrain data, a vision system, or a display system.

12. The module of claim 9, wherein the processor is configured to include in the definition of the second location data at least one second successive waypoint beyond the first successive waypoint and at least one additional flight path, where each additional flight path is formed between successive waypoints, such that
    the abbreviated pathway is further comprised of
        at least one second successive waypoint depicted as a location highlighter, and
        at least one additional flight path depicted as a straight or curved second connector between the location highlighters of the successive waypoints, where such second connector is depicted with an originating end and a terminating end.

13. The module of claim 9, wherein the highlighter data includes data associated with object characteristics, enhancing effects, or a combination of both.

14. The module of claim 9, wherein the boundary enhancing function is a function of the distance between the aircraft position and a centerline of the active path, the distance between the aircraft position and a boundary, a closure rate, or a combination thereof.

15. The module of claim 9, wherein the abbreviated pathway includes at least one straight and vertical ground position indicator originating and extending downward from the location highlighter of one waypoint.

16. A method for presenting an abbreviated pathway on a tactical display unit, such method comprising:
    performing the following elements, where such elements are performed by an aircraft avionics system processor:
        receiving navigation data representative of a flight plan and aircraft position and attitude from an aircraft navigation data source,
        receiving terrain data corresponding to the navigation data from an aircraft terrain data source,
        defining first location data representative of at least one boundary of an active flight path originating at a preceding waypoint and terminating at the next waypoint of the flight plan,
        defining second location data representative of the next waypoint of the flight plan, a first successive waypoint of the flight plan, and an approaching flight path originating at the next waypoint and terminating at the first successive waypoint of the flight plan,
        generating an image data set representative of an abbreviated pathway and a three-dimensional perspective scene outside the aircraft, wherein
            the image data set is generated as a function of the terrain data, first location highlighter data associated with the first location data, and second location highlighter data associated with the second location data, further wherein
            the first location highlighter data is determined using a boundary enhancing function, and
        providing the image data set to a display system for presenting an image represented in the image data set on a tactical display unit, whereby
            an abbreviated pathway appears on the tactical display unit superimposed against the three-dimensional perspective scene outside the aircraft, where the abbreviated pathway comprises a plurality of boundaries of the active path, where the location of each boundary is highlighted with a variable-visibility three-dimensional location highlighter, the next waypoint, the location of which is highlighted as a three-dimensional location highlighter, the first successive waypoint, the location of which is highlighted as a three-dimensional location highlighter, and the approaching flight path, depicted as a straight or curved first connector between the location highlighters of the next waypoint and the first successive waypoint, where such first connector is depicted with an originating end at the next waypoint and a terminating end at the first successive waypoint.

17. The method of claim 16, wherein the defining of the second location data includes at least one second successive waypoint beyond the first successive waypoint and at least one additional flight path, where each additional flight path is formed between successive waypoints, such that the abbreviated pathway is further comprised of at least one second successive waypoint depicted as a location highlighter, and at least one additional flight path depicted as a straight or curved second connector between the location highlighters of the successive waypoints, where such second connector is depicted with an originating end and a terminating end.

18. The method of claim 16, wherein the highlighter data includes data associated with object characteristics, enhancing effects, or a combination of both.

19. The method of claim 16, wherein the boundary enhancing function is a function of the distance between the aircraft position and a centerline of the active path, the distance between the aircraft position and a boundary, a closure rate, or a combination thereof.

20. The method of claim 16, wherein the abbreviated pathway includes at least one straight and vertical ground position indicator originating and extending downward from the location highlighter of one waypoint.

* * * * *